(12) United States Patent
Wunderlich (10) Patent No.: US 6,601,283 B2
(45) Date of Patent: Aug. 5, 2003

(54) METHOD FOR MANUFACTURING FLEXIBLE AND RIGID HANDLE CONTAINERS

(76) Inventor: Ernst Dieter Wunderlich, 55 Green Valley Dr., Warren, NJ (US) 07059

( * ) Notice: Subject to any disclaimer, the term of this patent is extended or adjusted under 35 U.S.C. 154(b) by 7 days.

(21) Appl. No.: 09/915,920

(22) Filed: Jul. 26, 2001

(65) Prior Publication Data

US 2003/0019091 A1 Jan. 30, 2003

(51) Int. Cl.[7] .............................................. B23P 11/02
(52) U.S. Cl. ................... 29/453; 264/533; 220/710.5; 220/729; 220/696; 220/699; 220/754; 220/757; 220/770; 215/396
(58) Field of Search ........................ 29/453; 264/531, 264/533; 220/754, 756, 759, 760, 766–776, 757, 758, 696, 699, 710.5, 729, 752; 215/396, 397, 398, 399

(56) References Cited

U.S. PATENT DOCUMENTS

| | | | | |
|---|---|---|---|---|
| 3,412,887 A | * | 11/1968 | Swartwood et al. | 215/397 |
| 3,469,728 A | * | 9/1969 | Bailey | 215/397 |
| 4,363,415 A | * | 12/1982 | Rainville | 215/396 |
| 4,368,826 A | * | 1/1983 | Thompson | 215/398 |
| 4,733,807 A | * | 3/1988 | Porter et al. | 224/604 |
| 4,915,241 A | * | 4/1990 | Morimura et al. | 215/398 |
| 4,993,931 A | * | 2/1991 | Belcher | 425/112 |
| 5,270,909 A | * | 12/1993 | Weiss et al. | 362/208 |
| 5,425,472 A | * | 6/1995 | Covault et al. | 220/754 |
| 5,437,369 A | * | 8/1995 | Spitere | 206/373 |
| 5,533,881 A | * | 7/1996 | Collette et al. | 425/525 |
| 5,564,583 A | * | 10/1996 | Kelley et al. | 220/23.83 |
| 5,637,167 A | * | 6/1997 | Krishnakumar et al. | 156/85 |
| 5,819,966 A | * | 10/1998 | Ota et al. | 215/398 |
| 5,988,418 A | * | 11/1999 | Maeshima | 215/396 |
| 6,460,715 B1 | * | 10/2002 | Yonemori et al. | 215/396 |

FOREIGN PATENT DOCUMENTS

| | | | | |
|---|---|---|---|---|
| CA | 2095948 | * | 3/1995 | A61J/9/06 |
| DE | 2712273 | * | 9/1978 | A47J/41/00 |
| JP | 403043354 | * | 2/1991 | B65D/23/10 |

* cited by examiner

Primary Examiner—Gregory Vidovich
Assistant Examiner—Essama Omgba
(74) Attorney, Agent, or Firm—Edward M. Fink

(57) ABSTRACT

Preforms or parisons are blow molded from synthetic resin into hollow articles including a neck region and a body area, the hollow articles having hooks and recessed areas formed into their outside walls. Flexible strings are molded below the neck region of varying thickness in the longitudinal direction to achieve molecular orientation of the synthetic resin. The flexible strings are looped around the hooks or lifted above the neck finishes to form flexible handle containers. Rigid handles or combined flexible string and rigid handle portions are incorporated into the hollow articles to form rigid handle containers.

2 Claims, 7 Drawing Sheets

METHOD FOR MANUFACTURING FLEXIBLE AND RIGID HANDLE CONTAINERS

BACKGROUND OF THE INVENTION

1. Field of the Invention

This invention relates to a method for manufacturing flexible and rigid handle containers. More specifically, the present invention relates to the preparation of integral flexible and rigid handle containers from preforms or parisons by a technique, wherein flexible strings, molecularly oriented in their longitudinal direction, are molded in the neck area or rigid handles are incorporated laterally into rigid hooks formed into the bodies of the hollow articles. Rigid handle brackets may also encapsulate the hooks and flexible handles to form rigid handle containers.

2. Description of the Prior Art

Certain extrusion blow molded or accumulator blow molded synthetic materials have been found unsuitable for forming a handle container, wherein the extruded parison is inflated and a portion of same is pinched off to form an integral handle during the blow molding process. This is due to insufficient bonding capability of the synthetic materials in the pinched off area to produce a leak-proof container. Further injection blow molded or stretch blow molded preforms cannot be inflated to form a closed looped handle into the blown portion of a hollow article because the synthetic material does not allow to be blown or pinched around a handle island in a blow mold cavity. Efforts to overcome these limitations have focused upon the use of different styles of holding means on hollow articles. Thus, for example, U.S. Pat. No. 4,627,546 discloses a flexible detachable handle and carrier for a plastic bottle attached to a bottle neck and bottle bottom. U.S. Pat. No. 5,013,074 discloses a support handle which supports a container and retains its body. Japanese Patent 08-135,042, U.S. Pat. No. 5,988,418, U.S. Pat. No. 4,964,522, and U.S. Pat. No. 5,819,966 each disclose a handle fixed into a recess in a side portion of a synthetic resin bottle. European Patent 1,094,927 discloses a bottle with pins formed into the neck area to receive a handle. U.S. Pat. Nos. 4,629,598, 4,372,454, and 4,280,859, and international Patent WO 0,112,515 each disclose a method for forming a plastic bottle with an integral rigid handle of an L-shape projection, wherein a ring in the neck area extends outwardly and downwardly from the ring towards the center of the gravity of the bottle to act in concert with its side wall. U.S. Pat. No. 4,615,451 discloses a flexible string serving as a suspension loop for caps sunk into a groove to protect a closure flap during transport. U.S. Pat. No. 5,862,929, JP09-018813, and Israeli Patent No. 119,681 each describe a stretch-blown bottle with one lateral open-ended rigid handle formed below the threaded portion of the neck, which includes a narrow portion and which is transversally provided for molecular orientation of the synthetic material to make the handle bendable in this one narrow portion. U.S. Pat. No. 6,227,393 and Egyptian Patent No. 20,953 disclose a stretch-blown bottle with two lateral opposing open-ended rigid handles formed in the neck area. Each joining handle has a flat section extending in a transverse direction and parallel to the longitudinal axis of the bottle to achieve molecular orientation in this portion of each handle to make it bendable upwardly and downwardly at said reduced thickness portion. U.S. Pat. No. 6,196,403 discloses a hanging tool comprising a flat and long connection portion extending sideways from the neck portion and a detachable handle portion attached to the connection portion. U.S. Pat. No. 4,281,770 discloses a method wherein recesses in the wall of the container are shaped to receive an enlarged end of a separately molded handle with enlargements on both ends of the handle shaped to fit into the recesses but shaped to expand the entrances to the recesses so as to insert the ends of the handles which expand the entrances into the recesses for connecting and disconnecting the handles.

SUMMARY OF THE INVENTION

1. Purposes of the Invention

It is the object of the invention to mold at least two rigid hooks in opposing directions and a recess into the body of a hollow article. It is a further object of the invention to wrap a flexible string over the hooks and the recessed area to form a closed-loop, flexible handle container. It is a further object of the invention to laterally snap lock rigid handle halves between and over the hooks to form a rigid handle container. It is a further object of the invention to mold a preform, whereby the ends of at least one flexible string of varying thickness are molded into different neck areas beneath the threaded portion of the preform. It is a further object of the invention to transform the preform with at least one flexible string molded into different areas beneath the threaded area of the neck finish into a hollow article. It is the further object of the invention to lift at least one flexible string of varying thickness over the threaded area of the neck finish to form a flexible handle container. It is a further object of the invention to produce a preform with at least one short flexible string molded into the neck area beneath the threaded area of a preform. It is yet another object of the invention to transform the preform into a hollow article with at least one short flexible string molded into the neck finish beneath the threaded area and a recessed area and a hook molded into the body of the hollow article.

It is a further object of the invention to loop a separate flexible string around the hook, over the recess in the body of the hollow article and to fasten the ends of the open ended flexible string to at least one short flexible string molded into the neck area to form a flexible-handle container. It is a further object of the invention to loop a combination flexible and rigid handle string around the hook, over the recess in the body of the hollow article and to fasten the ends of the open ended combination flexible and rigid handle string to at least one short flexible string molded into the neck area to form a rigid handle container when the rigid handle portions have been snap locked together. It is a further object of the invention to produce a preform with at least one rigid holding means molded into the neck area of the preform. It is a further object of the invention to loop a flexible string around the hook and over the recess in the body of a blow molded hollow article and attach the two ends onto said rigid holding means. It is a further object of the present invention to produce a preform with the ends of at least one flexible string of varying thickness molded into its neck area. It is a further object of the invention to transform the preform into a hollow article with a recess and a hook formed in its body. It is a further object of the invention to uncurl and loop the flexible string across the recess and over the hook formed in the body of the hollow article to form a flexible handle container. It is a further object of the invention to place a rigid handle bracket between the hook in the body of the finished hollow article and its neck area encapsulating the flexible handle to form a rigid handle container. It is a further object of the invention to mold the flexible string of varying thickness with a clip, wherein the clip locks the flexible string in position above the hook to ascertain a firm grip of the loop onto the hook to form a flexible handle container. It is a further object of the invention to mold the flexible strings of varying thickness in their longitudinal direction to molecular orient the molten material in the narrow sections during injection to obtain flexibility and tensile strength. And lastly, it is an object of the invention to pass the molded strings through a post treatment unit to increase their flexibility and strength prior to assembly to form flexible-handle containers.

BRIEF DESCRIPTION OF THE INVENTION

In accordance with the present invention, at least two rigid hooks and a recessed area are blow molded into the body of a hollow article. The term blow molding as employed herein includes at least stretch blow molding, extrusion blow molding, injection blow molding or accumulator head blow molding. Either a flexible or a rigid handle is mounted over the hooks and the recessed area to form a handle container. Alternatively, at least one short holding means is molded into the neck area and a hook means into the body of a hollow article. A flexible string or a rigid handle combined with a flexible string is looped over the hook and fastened to the short holding means to form a handle container. An alternative embodiment involves the use of a flexible string whose ends are molded into the neck area of a hollow article which can either be lifted above the neck area or looped over a hook formed in the body of the hollow article, so resulting in a flexible handle container. The flexible handle can be transformed into a rigid handle by encapsulating at least one flexible string with a separately formed rigid handle bracket.

Prior to applicant's entry into the field, handle containers were either molded first with rigid pins in the neck area or recesses in a side portion of a bottle and handles of different synthetic materials are forced subsequently into said recesses or hollow articles with rigid L-shaped handles molded into the neck areas, whereby their lower extremities are somehow affixed to a blown portion of the containers, or containers with flat-shaped open-ended rigid handles extending into a transverse direction from the container's neck areas with a bendable in an upward and downward direction in one narrow portion. The drawback of forcing rigid handles into recesses in the side portion of a bottle is that they need to be filled and capped or pressurized first to resist the bending pressures applied onto the flexible container walls when securing the rigid handle into the bottle main body.

BRIEF DESCRIPTION OF THE DRAWINGS

The invention will be more readily understood by reference to the following detailed description taken in conjunction with the accompanying drawings, wherein.

DETAILED DESCRIPTION OF THE INVENTION

Figures 1, 2, 4:
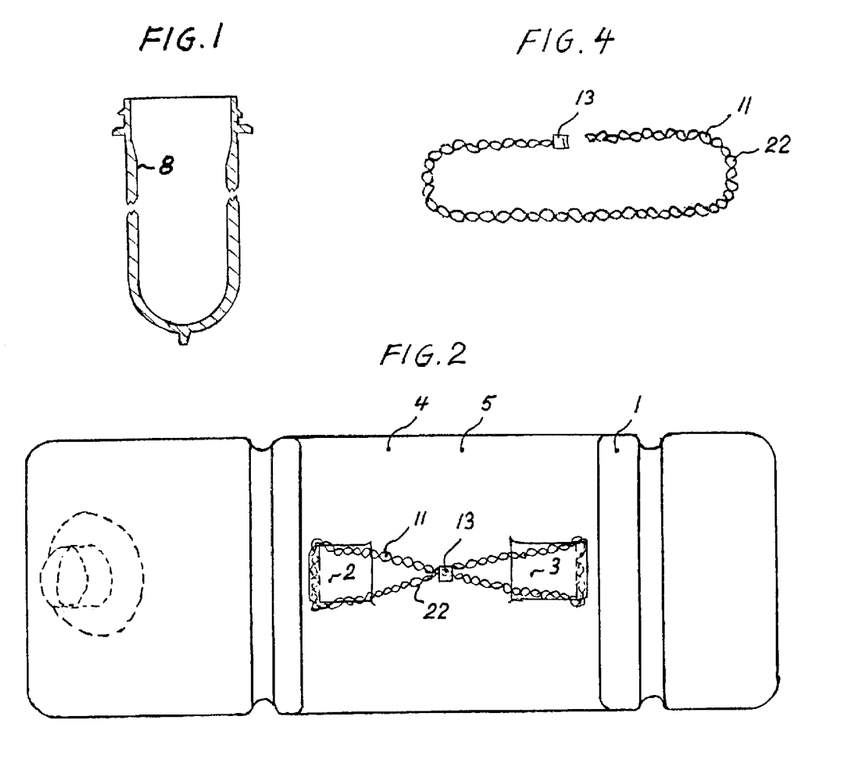
FIG. 1 is a side view, partly in perspective, of a typical preform employed in the practice of the present invention.
FIG. 2 is a top view of a container of the present invention having a flexible string looped over a multitude of hooks and a recessed area molded into its body and joined together with a clip.
FIG. 4 is a top view of a flexible string with a joining clip employed in the practice of the present invention.
Figure 3:
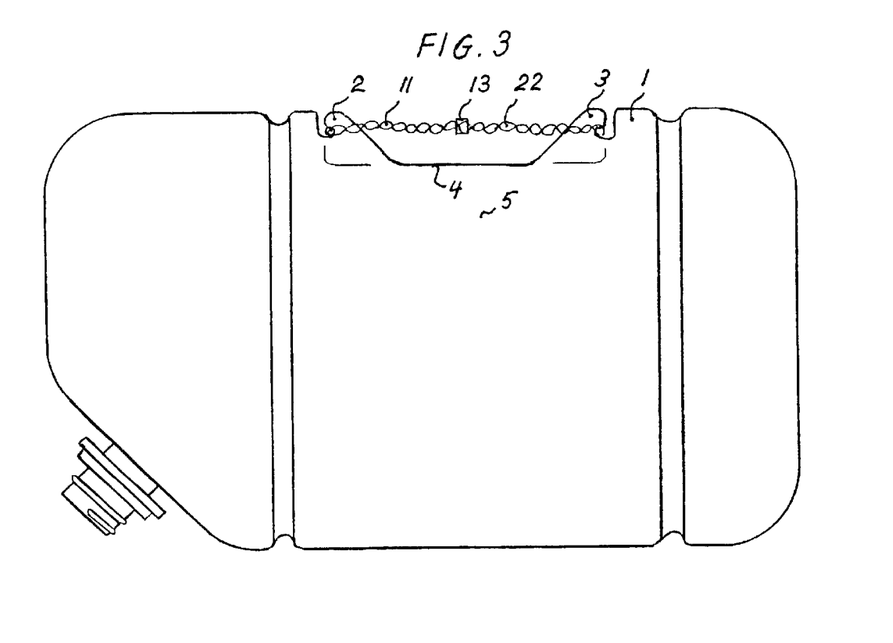
FIG. 3 is a side view of a container of the invention adapted with a flexible string looped over a multitude of hooks and a recessed area molded in the body and joined together with a clip.
Figures 5, 6, 7, 8, 9:
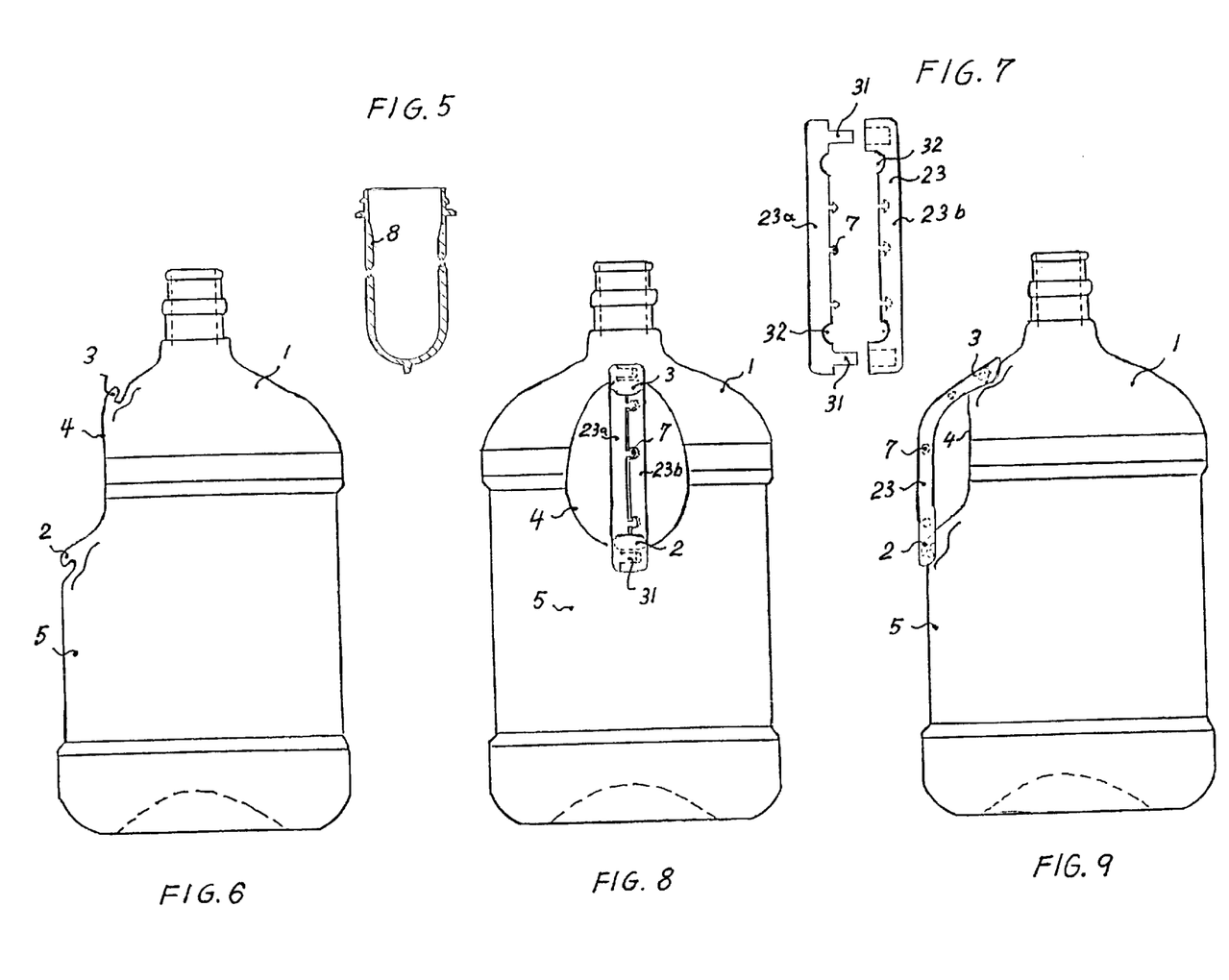
FIG. 5 is a side view, partly in perspective, of a preform or parison employed in the practice of the present invention.
FIG. 6 is a side view of a container adapted with two hooks and a recessed area molded into the body thereof.
FIG. 7 is a top view of two rigid handle halves with snap locks and holding bars.
FIG. 8 is a back view of a container with the two rigid handle halves mounted between and over hooks and accross a recessed area and snap locked together.
FIG. 9 is a side view of a container with two rigid handle halves mounted between and over hooks and accross a recessed area and snap locked together.

The first step in the practice of the present invention involves forming a hollow article (container) comprising a neck region and a body by blow molding a preform or parison comprising a synthetic material such a polyethylene terephthalate, polycarbonate, and the like. Simultaneously, at least one rigid hook and a recessed area are blow molded in the body of the hollow article. Then, a flexible string or rigid handle is incorporated into the hollow article. The invention will be more fully understood by reference to the drawing which follows. In the practice of the present invention, a preform 8 or parison (shown in FIG. 1) is blow molded into a container 1 (FIG. 2) adapted with two hooks 2 and 3, and a recessed area 4 molded into its body 5. A flexible string 11 is of sufficient length to be looped over hooks 2 and 3 and recessed area 4 and joined together with clip 13 to form a flexible handle 22 (see FIGS. 2, 3, and 4). FIG. 3 shows the side view of the same container 1 as described in FIG. 2. FIG. 5 shows a preform 8, which is molded by conventional techniques into a container 1 as shown in FIG. 6 having two hooks 2 and 3 and a recessed area 4 molded into the body 5. FIG. 7 shows rigid handle halves 23a and 23b with holding bars 31, snap lock system 7 and cut outs 32. The rigid handle halves 23a and 23b (FIG. 8), having a length corresponding to the distance between the hooks 2 and 3 of the container 1, shown in FIG. 6, and a snap lock system 7 in their inner lateral sides and holding bars 31 and cut outs 32 to fit around and in between the hooks 2 and 3 with their inner lateral sides. In FIGS. 8 and 9 the rigid handle halves 23a and 23b are snapped together with the snap lock system 7 enveloping the hooks 2 and 3 and the recessed area 4 to form a container 1 with a rigid handle 23.

Figure 10:
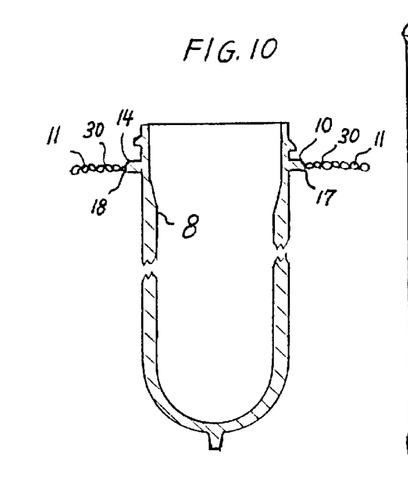
FIG. 10 is a side view of a preform, partly in perspective, having the ends of a flexible string molded into different areas of its neck finish.
Figure 11:
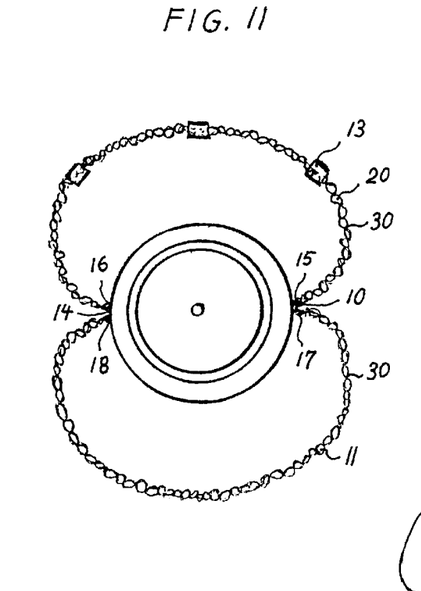
FIG. 11 is a top view of a preform having the ends of a multitude of flexible strings molded into different areas in the neck area thereof and clips molded into at least one flexible string.
Figure 12:
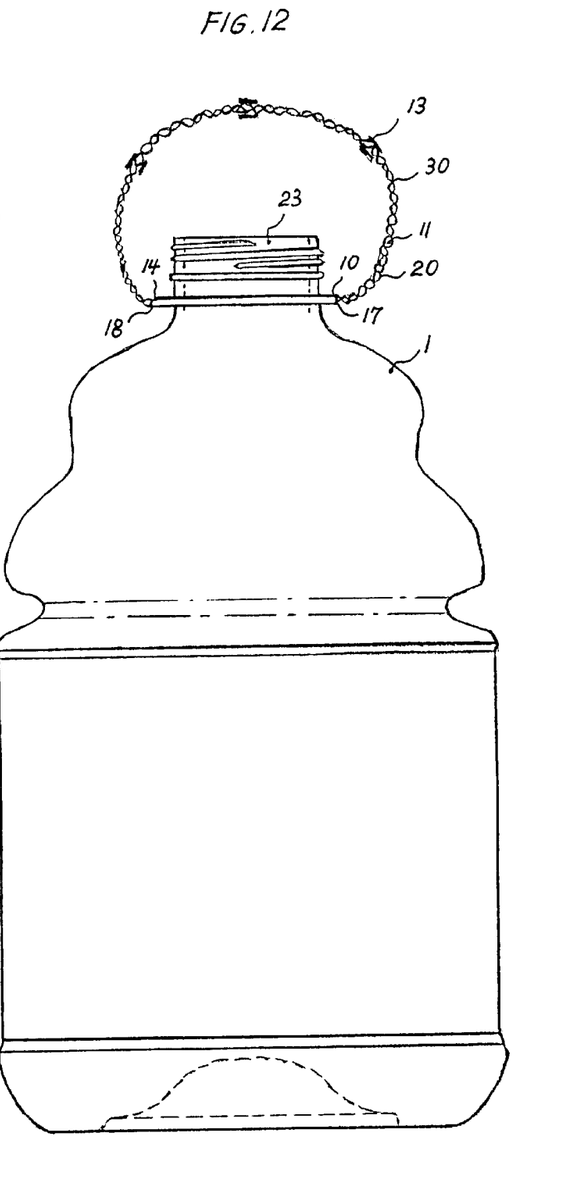
FIG. 12 is a side view of a container with the ends of flexible strings molded into its neck area and lifted up above the neck finish and clipped together.
Figures 13, 14, 14A, 15, 16:
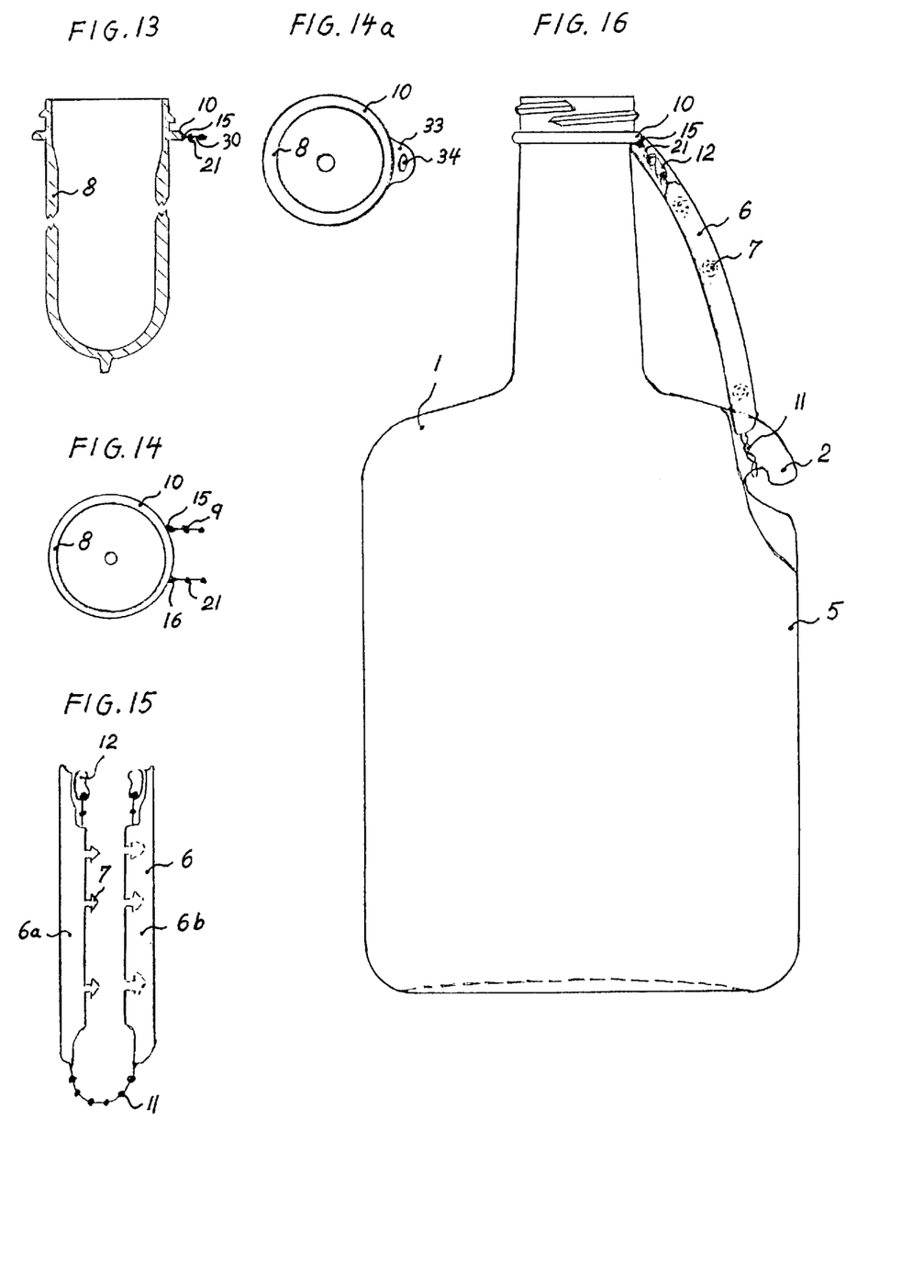
FIG. 13 is a side view, partly in perspective, of a preform with one end of a short flexible string molded into its neck area.
FIG. 14 shows the top view of a preform having one end of a short flexible string molded into its neck area.
FIG. 14a is a top view of a preform with a rigid holding means molded into its neck area.
FIG. 15 is a top view of an open-ended combined flexible string having fasteners and a rigid handle portion with snap locks.
FIG. 16 is a side view of a container having one end of a short flexible string means molded into its neck area, a hook molded into its body and a combination flexible string and rigid handle portion fastened onto a short flexible string.

FIG. 10 shows the side view of preform 8 having its ends 17 and 18 of a molecular oriented flexible string 11 of varying thickness 30 molded into different neck areas 10 and 14. FIG. 11 shows the top view of a preform 8 with a multitude of molecular oriented flexible strings 11 and 20 of varying thickness 30, whose ends 15, 16, 17, and 18 are molded into different neck areas 10 and 14 and fastening clips 13 molded in at least one flexible string 20. FIG. 12 shows the side view of container 1 with the flexible strings 11 and 20 of varying thickness 30, long enough to form a flexible handle 22 whose ends 15, 16, 17 and 18 are molded into the neck areas 10 and 14, lifted up above the neck finish 23 and joined together with clips 13. FIG. 13 shows the side view of a preform 8 with the end 15 of a molecularly oriented short flexible string 21 of varying thickness 30 molded into the neck area 10. FIG. 14 shows the top view of the preform 8 with the ends 15 and 16 of the molecularly oriented short flexible string 9 and 21 molded into the neck area 10. FIG. 14a shows the top view of a preform 8 with a rigid holding means 33 with fastening hole 34 molded into the neck area 10. FIG. 15 shows an open-ended combined flexible string 11 with rigid handle portions 6a and 6b as well as a snap lock system 7 in the inner lateral sides of the rigid handle portions 6a and 6b and fasteners 12 on each end. FIG. 16 shows the side view of container 1 with the end 15 of a short flexible string 21 molded into the neck area 10, and with a hook 2 molded into the side wall 5. The combined flexible string 11 and rigid handle portion 6 are looped over the hook 2. The open-ended portion of the combined flexible string 11 and rigid handle portion 6 is long enough to be attached with fasteners 12 to at least one end of the short flexible string 21 molded with the other end 15 into the neck area 10 and snapped together with the snap lock system 7 to form a container 1 with a rigid handle 6.

Figures 17, 18, 19, 20:
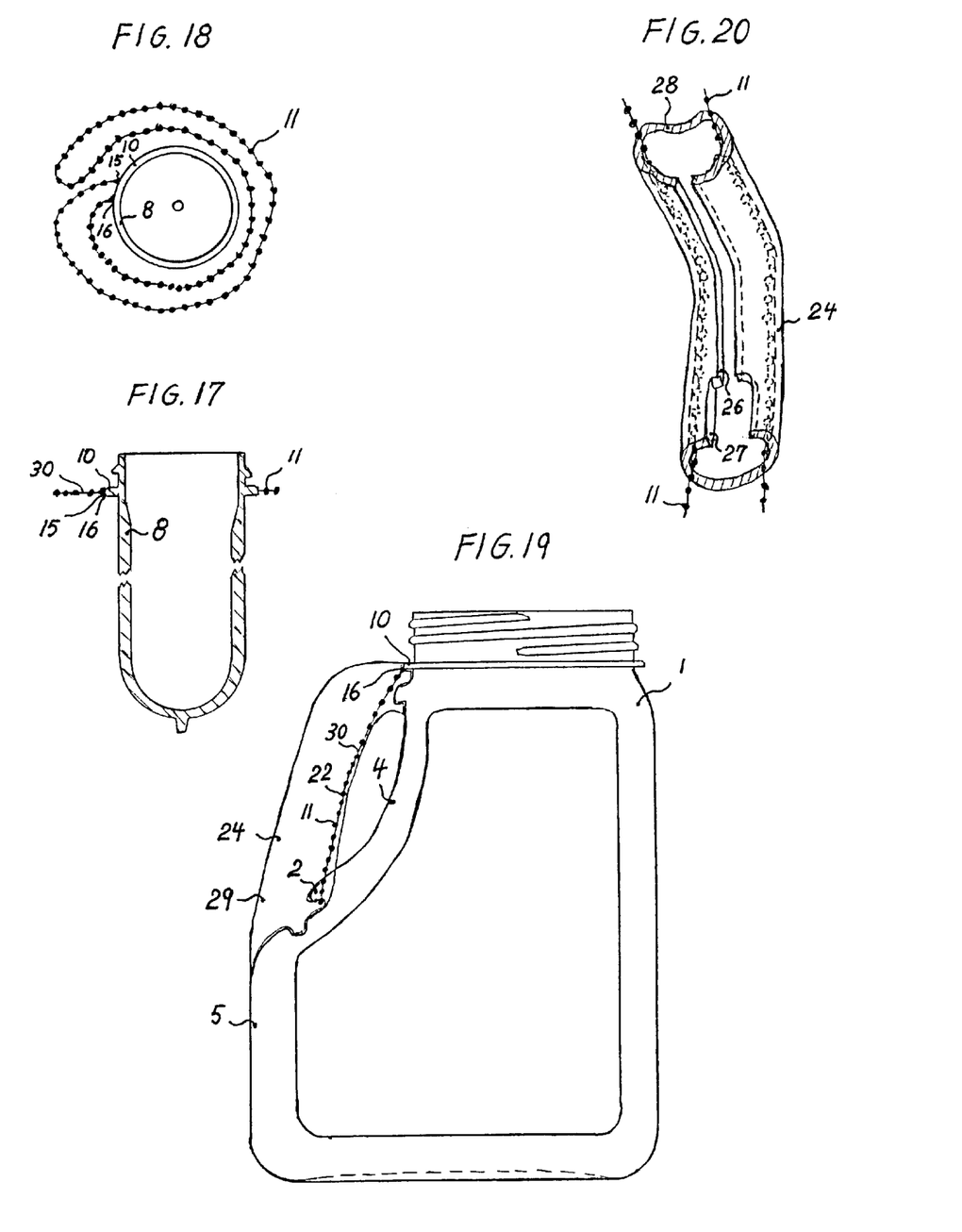
FIG. 17 is a side view, partly in perspective, of a preform having the ends of a flexible string molded into its neck area and curled around the same.
FIG. 18 is a top view of a preform having the ends of a flexible string molded into its neck area and curled around the same.
FIG. 19 is a side view of a container having the ends of a flexible string molded into its neck area and looped over a recessed area and a hook molded in its body as well as a rigid handle bracket braced between the neck and hook area in encapsulating the flexible string.
FIG. 20 is a front elevational view of a rigid handle bracket having a longitudinal and enlarged cut-out on its lower side.

FIG. 17 shows a preform 8 with the ends 15 and 16 of a molecular oriented flexible string 11 of varying thickness 30 molded into the neck area 10 and curled around the same neck area 10. FIG. 18 shows the top view of the preform 8 with the ends 15 and 16 of the flexible string 11 molded into the neck area 10 and curled around the same neck area 10. FIG. 19 shows a container 1 molded out of the preform 8 shown in FIG. 17 with the uncurled flexible string 11 molded into the neck area 10, looped over a hook 2 and a recessed area 4 molded into the body 5 to form a flexible handle container 22. A rigid handle bracket 24 is encapsulating the flexible handle 22 to form a container with a rigid handle 29. FIG. 20 shows a front elevated view of a rigid handle bracket 24 with a longitudinal cut out in its lower side 26 and a same side enlarged cut out 27 to lock into a hook (not shown) and a contoured end 28 to envelope a neck area (not shown) and a looped flexible string portion 11 to hold the rigid handle bracket 24 firmly in place when mounted onto a container (not shown).

Figure 21:
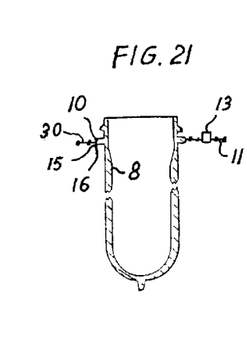
FIG. 21 shows a side view, partly in perspective, of a preform having a flexible string molded into its neck area.
Figure 22:
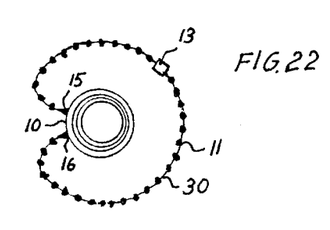
FIG. 22 is a top view of a preform having the ends of a flexible string molded into its neck area.
Figure 23:
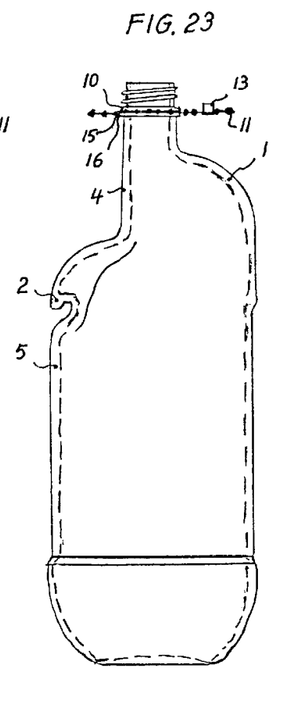
FIG. 23 is a side view of a container having the ends of a flexible string and clip molded into its neck area and a recessed area as well as a hook molded in its body.
Figure 24:
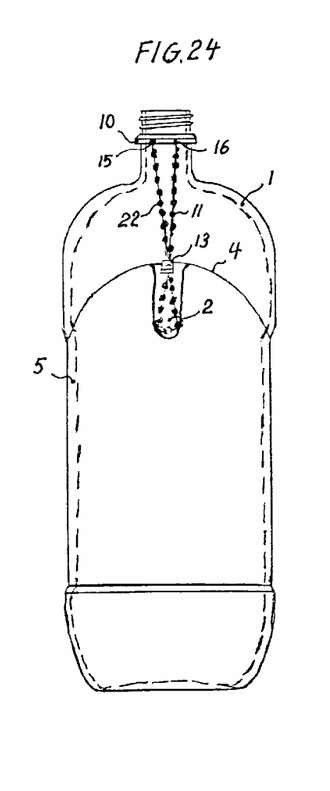
FIG. 24 is a back view of a container having a flexible string looped from its neck area over its recessed area and a hook in the body thereof, twisted and joined together over the hook with a molded-in clip.
Figure 25:
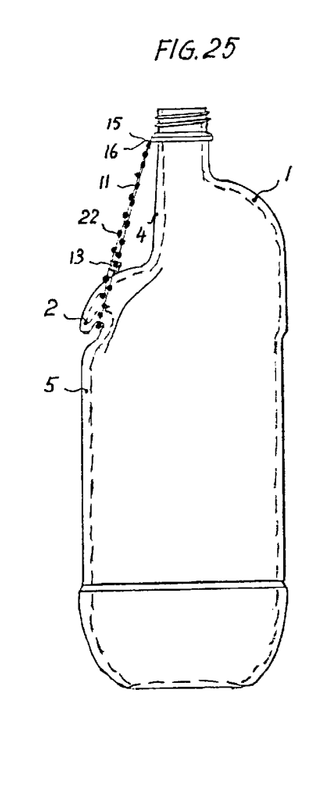
FIG. 25 is a side view of a container having a flexible string looped from its neck area over its recessed area and a hook in the body, twisted and joined together over the hook with a molded-in clip.

FIG. 21 shows a preform 8 with the ends 15 and 16 of a molecular oriented flexible string 11 of varying thickness 30 containing a clip 13 molded into the neck area 10 and curled around the same. FIG. 22 shows the top view of the preform 8 with the ends 15 and 16 of a molecular oriented flexible string 11 of varying thickness 30 containing a clip 13 molded into the neck area 10 and curled around the same. FIG. 23 shows the side view of a container 1 with the ends 15 and 16 of the flexible string 11 containing a clip 13 molded into the neck area 10 and a hook 2 as well as a recessed area 4 molded into the body 5. FIGS. 24 and 25 show back and side views respectively of a container 1 with a flexible string 11 long enough to be looped from the neck area 10 over the recessed area 4 and the hook 2 in the body 5, and joined above the same hook 2 with the molded in clip to form a container 1 with a flexible handle 22.

Figure 26:
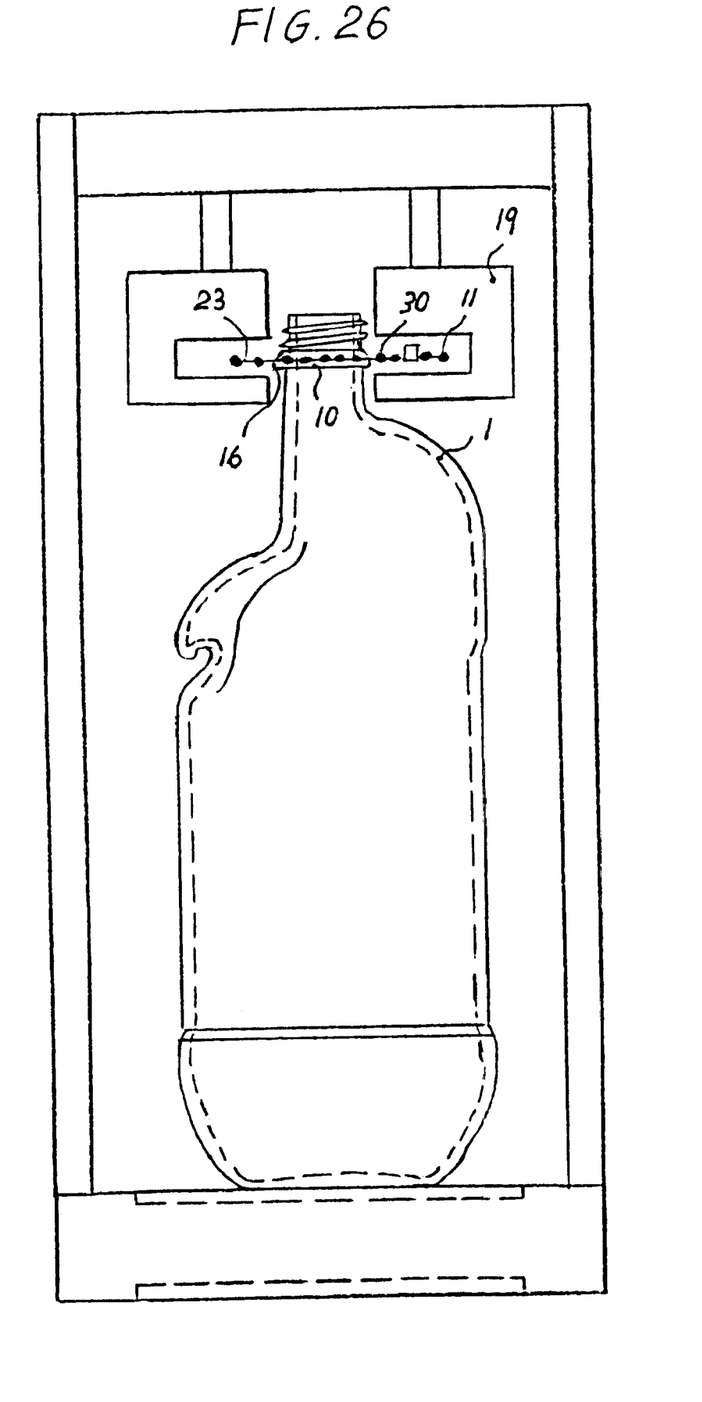
FIG. 26 is a side view of a post-treating unit for flexible strings whose ends are molded into the neck area of a container.

FIG. 26 shows the side view of a post treating unit 19 for flexible strings 11 of varying thickness 30 which have been molecular oriented in their narrow passages 30 during injection and whose ends 15 and 16 are molded into the neck area 10 of a container 1.

It will be understood by those skilled in the art that each of the elements described above, or two or more together, may also be used in alternate methods of manufacturing handle containers therein and in other methods and apparatuses for the preparation of hollow articles with flexible and rigid handles.

While the invention has been described in detail in the foregoing specifications and drawings, it will be appreciated that the description is not intended to be limited to the details shown and various modifications and structural changes may be made without departing from the spirit and scope of the invention.

What is claimed is:

1. A method for the fabrication of a container having a flexible handle comprising the steps of
   (a) blow molding from a synthetic resin a hollow article including a neck area having a thread region and a body area having an outside wall,
   (b) blow molding at least two rigid hooks, formed in opposing directions, and a recessed area into the outside wall of said hollow article, (c) looping a flexible string around said hooks and over the recessed area to form a flexible handle container, and (d) joining said flexible handles together with at least one molded-in clip.

2. A method for the fabrication of a container having a rigid handle comprising the steps of (a) blow molding from a synthetic resin a hollow article including a neck area having a thread region and a body area having an outside wall, (b) blow molding at least two rigid hooks, formed in opposing directions, and a recessed area into the outside wall of said hollow article, (c) placing rigid handle halves between and around the hooks and over the recessed area, and (d) snapping said rigid handle halves together to form a rigid handle container.

* * * * *